(No Model.)

S. EASTMAN.
EYEGLASSES.

No. 511,293. Patented Dec. 19, 1893.

Witnesses
Chas. F. Schmelz.
H. W. Fowler

Inventor
Sylvester Eastman,
By his Attorney
Rufus B. Fowler

UNITED STATES PATENT OFFICE.

SYLVESTER EASTMAN, OF PROVIDENCE, RHODE ISLAND.

EYEGLASSES.

SPECIFICATION forming part of Letters Patent No. 511,293, dated December 19, 1893.

Application filed April 11, 1889. Serial No. 306,901. (No model.)

*To all whom it may concern:*

Be it known that I, SYLVESTER EASTMAN, a citizen of the United States, and a resident of Providence, in the county of Providence and State of Rhode Island, have invented a new and useful Improvement in Eyeglasses, of which the following is a specification, containing a full, clear, and exact description of the same, accompanied by drawings forming a part of this specification, and representing a pair of eyeglasses embodying my invention.

The object of my invention is to provide eyeglasses, adapted to be worn by attachment upon the nose and whose lenses can be permanently adjusted in true relation with the optic axes of each individual wearer.

Figure 1:
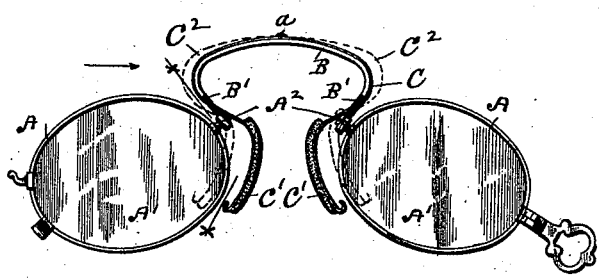
Figure 2:
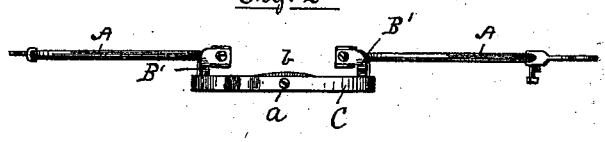
Figure 3:
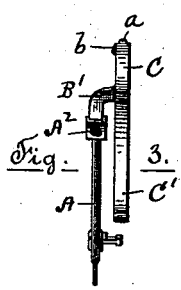
Figure 4:
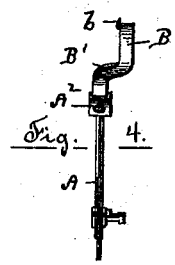
Figure 5:
Figure 6:
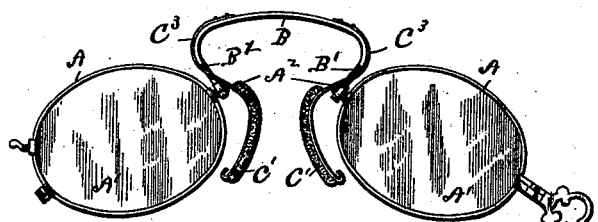

In the accompanying drawings. Figure 1 denotes a rear view of a pair of eyeglasses, showing the construction by which I secure the objects of my invention. Fig. 2 is a top view of the same. Fig. 3 represents a sectional view on line $x$, $x$, Fig. 1, one of the eye-wires having been removed. Fig. 4 is a similar sectional view, but having the nose-guard spring removed in order to disclose the form of the bridge. Fig. 5 is a transverse sectional view of the bridge, on line $x'$, $x'$, Fig. 1 and upon a larger scale, and Fig. 6 represents a rear view of a pair of eyeglasses, having the nose-guard spring made in two parts, each separately attached to the bridge of the eyeglasses.

Similar letters refer to similar parts in the several figures.

Referring to the drawings, A, A, denote the eye-wires, inclosing the lenses A', A' and provided with lugs $A^2$ to which I attach the ends of the rigid bar B, connecting the eye-wires and forming the bridge of the eyeglasses.
The bridge B is offset at B', B', in order to bring the central portion between B', B', out of the plane of the eye-wires A, A, and to the offset central portion of the bridge I attach the blade spring C, to whose free ends are attached two nose-guards C', C', which are thus brought at the rear of and in a different plane from the eye-wires A, A, so they may be separated by their application to the nose without interfering with the eye-wires.

The blade spring C is attached, in the construction shown in the drawings, by means of a screw $a$, passing through the center of the blade spring and entering a screw threaded hole in the center of the bridge B. At one edge of the bridge I have shown a lip $b$ turned at right angles with the bridge and serving to prevent the spring C from turning upon the screw $a$. The bridge piece B is curved to correspond nearly in form with the elastic spring by which the eye-wires are usually connected in eyeglasses of this kind, extending above the bridge and out of contact with it so the eye-wires can be raised or lowered without bringing the bridge B into contact with the nose.

The material of which I form the bridge B is preferably of some material sufficiently rigid to preserve the proper relation of the eye-wires after their adjustment to the eyes and also sufficiently ductile to permit of its shape being somewhat varied in order to secure the desired adjustment of the glasses, and to bring the center of each of the lenses in true alignment with the optic axes. By removing the screw $a$ other nose-guard springs having greater or less tension, or of different curvature can be substituted for the spring C, and the inclination or pressure of the nose-guards thereby varied with each individual wearer. The separation of the nose-guards, as when applied to the nose, will cause the expansion of the nose-guard spring C, as shown by the broken lines $C^2$ in Fig. 1, without changing the relative position of the lenses A', A', which may be adjusted to the optic axes by changing the curvature of the bridge B. This result is accomplished by the method of attaching the nose-guards to the rigid bridge, by means of two independent springs $C^3$, as shown in Fig. 6, and such construction I therefore deem to come within the scope of my present invention, but I prefer to attach the nose-guards by means of a single spring C attached substantially at its central section, as that method of attachment allows the rigid bridge B to be varied or changed in its curvature to bring the lenses A', A', into true alignment with the optic axes, as they are supported upon the nose by the pressure of the nose-guards.

In the adjustment of the eyeglasses to the wearer, they are placed upon the nose and the tension and curvature of the nose-guard spring adjusted to secure the proper inclination and pressure of the nose-guards upon the nose, in that position most convenient and natural for the wearer, which will therefore, become the position, which they will usually assume as the eyeglasses are applied to the nose. After the position and adjustment of the nose-guards are determined, the adjustment of the lenses can be accomplished by so shaping the bridge B, that the lenses shall stand in alignment with the optic axes and at the proper distance from the eyes.

As shown in Fig. 6 the bridge is offset in the same manner as shown in Figs. 1, 2 and 3 in order to bring the nose-guard springs to the rear of the lenses, but in cases where the distance between the eye-wires was sufficient the springs can be attached to the under side of the bridge, which can then be straight, or lying in the same plane as the eye-wires A, A.

I do not herein claim broadly, connecting the nose-guard springs to the bridge uniting the eye-wires, as such connection has been heretofore made, but eyeglasses having nose-guard springs attached to the bridge between the eye-wires have had an elastic bridge consisting of a bow spring connecting the eye-wires, and the nose-guard springs have been attached upon each side of the center of the bow spring so that the flexure of the bow spring would vary the position of the nose-guards. Such a construction is shown in the patent to Kabus, dated November 16, 1880, Serial No. 234,581.

In the eyeglasses forming the subject of my present invention the bridge connecting the eye-wires is a rigid bridge capable of being bent or so shaped as to bring the lenses into proper relations with the eyes and the nose-guard spring or springs are attached to the upper side of the bridge so as to allow the springs to be lifted away from the bridge as shown by the broken lines $C^2$, Fig. 1, thereby securing greater freedom of action of the nose-guard springs and the bridge is offset to bring the nose-guards into proper position at the rear of the eye-wires. It will, however, be obvious that the same result can be accomplished by offsetting the nose-guard spring instead of the rigid bridge and that such modification would therefore come within the scope of my present invention. When the nose-guard springs are attached to an elastic bow spring connecting the eye-wires said attachment can be made upon the under side of the bow spring for the reason that any pressure upon the nose-guards to separate them as in the act of placing the eyeglasses upon the nose will cause the bow spring to be expanded and its tension exerted upon the nose-guards to hold the eyeglasses in position upon the nose. When the bridge connecting the eye-wires is a rigid and inelastic bridge instead of a bow spring this tension of the bow spring is not available and the nose-guard springs themselves must be so attached to the bridge as to allow that freedom of action, which will allow a uniform pressure to be exerted upon the nose-guard and this result can only be secured when a rigid bridge is employed by the construction herein before shown and described.

When the nose-guard spring is attached to the upper side of an elastic bridge, or bow spring, the point of union between the nose-guard spring and the elastic bridge should come in the center of the bridge so the nose-guard will not be displaced as the elastic bridge is bent in the operation of folding the eye-wires together. This method of attachment of a nose-guard spring carrying nose-guards upon its free ends and attached at its central section to the central section of an elastic bow spring I do not herein claim, as such a construction was made the subject of my application for Letters Patent filed March 16, 1889, and Serial No. 303,518. My present invention, however, consists in its essential features of the combination with eye-wires connected by a rigid or inelastic bridge, capable of being shaped or bent to bring the lenses in proper relations to the eyes of the wearer, of a nose-guard spring or springs attached to the upper side of said rigid bridge and being offset, or having the bridge offset, which is substantially the same thing, so as to bring the nose-guards into a plane at the rear of the eye-wires.

What I claim as of my invention, and desire to secure by Letters Patent, is—

1. The combination with a pair of lenses and a rigid connecting bar curved to extend over the nose and out of contact therewith, of nose-guard springs attached at one end to the upper or convex side of said rigid connecting bar or bridge and with the free ends of said springs brought into a plane at the rear of said lenses and nose-guards attached to the free ends of said springs, substantially as described.

2. The combination with the frame of a pair of eyeglasses, comprising a curved bar forming the bridge, said bridge extending across and above the nose and out of contact therewith, and having offsets, whereby its central section is brought in a different plane from the eye-wires, of a spring attached at its central section to the central section of said bridge, substantially as described.

3. The combination with the bridge of a pair of eyeglasses said bridge being provided with a lip or shoulder forming an angle with said bridge, of a spring attached to said bridge and resting against said lip, in order to hold the spring parallel with the bridge, and nose-guards attached to the free ends of said spring, substantially as described.

4. The combination of eye-wires A, A, rigid curved bridge B having offsets B', B', spring C attached at its central section to said bridge at its central section, and nose-guards C', C', attached to the free ends of said spring and arranged to press upon the sides of the nose and support said bridge and connected eye-wires, substantially as described.

SYLVESTER EASTMAN.

Witnesses:
WM. H. HERRICK,
ROBERT W. BURBANK.